United States Patent [19]

Deuring

[11] Patent Number: 4,470,605
[45] Date of Patent: Sep. 11, 1984

[54] SHAFT SEAL ASSEMBLY AND METHOD OF MAKING THE SAME

[75] Inventor: Hans Deuring, Burscheid, Fed. Rep. of Germany

[73] Assignee: Goetze AG, Burscheid, Fed. Rep. of Germany

[21] Appl. No.: 568,641

[22] Filed: Jan. 6, 1984

[30] Foreign Application Priority Data

Jan. 13, 1983 [DE] Fed. Rep. of Germany ....... 3300942

[51] Int. Cl.³ .......................... F16J 15/32; F16J 15/20
[52] U.S. Cl. ......................................... 277/1; 277/153; 277/165; 277/166; 277/DIG. 6
[58] Field of Search .................... 277/1, 152, 153, 165, 277/166, DIG. 6, 9, 9.5

[56] References Cited

U.S. PATENT DOCUMENTS

| 3,095,619 | 7/1963 | Peterson ................................... 277/1 |
| 3,576,326 | 4/1971 | Hafner et al. ............................ 277/1 |
| 4,141,563 | 2/1979 | Wu ........................................ 277/152 |
| 4,201,804 | 5/1980 | Stecher et al. . |
| 4,248,439 | 2/1981 | Haslett . |
| 4,311,346 | 1/1982 | Danner . |
| 4,328,972 | 5/1982 | Albertson et al. ...................... 277/1 |

FOREIGN PATENT DOCUMENTS

| 972155 | 5/1959 | Fed. Rep. of Germany ...... 277/152 |
| 2304558 | 8/1974 | Fed. Rep. of Germany . |
| 3120795 | 4/1982 | Fed. Rep. of Germany . |
| 2101238 | 1/1983 | United Kingdom ................ 277/152 |
| 806963 | 2/1981 | U.S.S.R. ............................... 277/152 |
| 870813 | 10/1981 | U.S.S.R. ............................... 277/152 |

Primary Examiner—Robert S. Ward
Attorney, Agent, or Firm—Spencer & Frank

[57] ABSTRACT

A shaft seal assembly for installation and operation in an annular space defined between first and second relatively rotatable machine components. The shaft seal assembly has a housing adapted to engage the first machine component, a runner ring surrounded by the housing and adapted to engage the second machine component, a chamber defined by the housing and bounded by the runner ring and a sealing body disposed in the chamber. The sealing body is an incompletely polymerized elastomer fully polymerizable subsequent to the installation by heat generated during operation of the first and second machine components.

11 Claims, 2 Drawing Figures

SHAFT SEAL ASSEMBLY AND METHOD OF MAKING THE SAME

BACKGROUND OF THE INVENTION

This invention relates to a shaft seal assembly which includes a form-retaining shaped housing having an outer circumferential surface intended to be in frictional engagement with a first (stationary) machine component and a runner ring surrounded by the housing and intended for insertion on and frictional contact with a second (rotary) machine component. At least one sealing lip made of an elastic material is in a sliding engagement with an outer cylindrical face of the runner ring. The assembly further includes a sealing body situated between a radial annular leg part of the runner ring and the housing.

German Offenlegungsschrift (application published without examination) No. 3,120,795 discloses a shaft seal assembly situated between a stationary and a rotary machine component. The shaft seal assembly comprises two coaxially arranged form-retaining parts which are form-fittingly inserted into one another by means of collar-like, angled and axially extending attachments. The sealing lips of an elastomer body formed at the radial annular leg portion of the stationary seal assembly part engage the corresponding running face of the rotary seal assembly part. An annular sealing body made of a porous filter material, for example, an open-cell polyurethane which may be elastically compressed in the installed state, is situated axially between the two seal assembly parts. It is the purpose of the sealing body to prevent penetration of foreign bodies, such as fragments, dust or mud, into the sealed zone. The sealing body is elastically compressible and thus generates a certain biasing force. It is a disadvantage of this prior art construction that a significant friction is generated between the runner ring and the sealing body because of the relative rotation of large surface areas. This circumstance, dependent upon the selection of the material, causes a relatively rapid loss of the biasing force and may even lead to the destruction of the sealing body.

SUMMARY OF THE INVENTION

It is an object of the invention to provide an improved shaft seal assembly of the above-outlined type in which damaging or destruction of the sealing body during service is largely avoided and thus the service life of the entire shaft seal assembly is significantly increased.

This object and others to become apparent as the specification progresses, are accomplished by the invention, according to which, briefly stated, the sealing body is an incompletely polymerized elastomer material which is fully polymerized only in service, by the heat generated during operation.

The sealing body which preferably is obtained from a hose-like stock material, acts as an axial spring in the new condition of the shaft seal assembly and assumes its final shape only during the run-in period by virtue of further polymerization. The measures according to the invention ensure that the initial frictional losses are significantly less than in conventional structures.

The sealing body is preferably made of nitrile butadiene rubber and has, prior to its installation, an approximately rectangular cross-sectional shape. Other materials such as, for example, chloroprene rubber, styrene butadiene rubber or the like and other cross-sectional shapes such as round, polygonal or similar configurations may also be used within the scope of the invention. The selection of material and/or the cross-sectional shape for the sealing body depends from the individual environment of use of the shaft seal assembly and from its circumferential contour.

According to a further feature of the invention, the space which is situated between the housing and a part of the runner ring and which accommodates the sealing body has an annular, generally conical shape extending and widening towards the runner ring. This feature ensures that the sealing body may be immobilized axially in the housing with a bias (slight compression) and further, by virtue of a conical counter face of a seal assembly component, it may exert both a radial and an axial force component in its new (not fully polymerized) state. Preferably, a radially extending annular leg portion of the runner ring, which is in contact with the sealing body in the incompletely polymerized state, has a convex contact surface. This arrangement has the advantage that contact between the runner ring and the sealing body occurs over a relatively small surface area and thus between the runner ring and the sealing body wear due to a relative rotation between sealing body and runner ring is limited to such reduced contacting surfaces. The axial force component present in the new (incompletely polymerized) condition of the sealing body disappears during the run-in period, that is, while the further polymerization of the sealing body is in progress, whereby labyrinth gaps adapted to the structural conditions are produced which compensate for tolerances.

DESCRIPTION OF THE PREFERRED EMBODIMENTS

Figure 1:
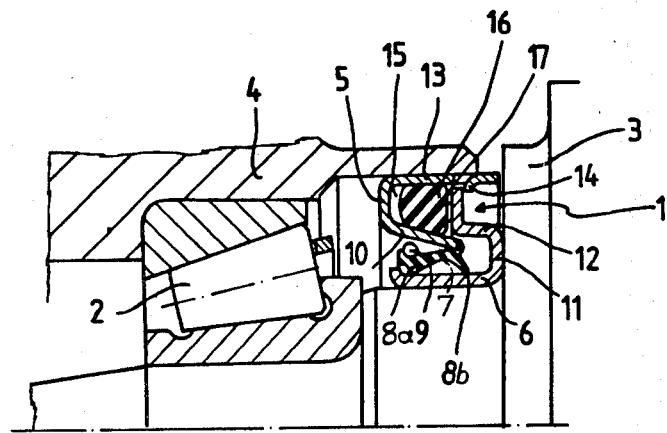
FIG. 1 is an axial sectional view of a preferred embodiment of the invention shown in the installed state during service.

Turning to FIG. 1, there is illustrated a shaft seal assembly 1 in its installed state, after run-in. The shaft seal assembly 1 is used for sealing a bearing 2 of a wheel 3 which may be a tractor wheel and thus the bearing has to be protected against heavy soiling.

The shaft seal assembly 1 comprises an annular housing 5 which is fixedly attached to the bearing housing 4 and which has a generally U-shaped cross-sectional outline. The shaft seal assembly 1 further has a runner ring 6 which is held captive in the housing 5, and an annular sealing element 7 which surrounds the runner ring 6 and which has two sealing lips 8a and 8b. The sealing element 7 is, in the zone of the sealing lip 8a, surrounded by an annular coil spring 9 for exerting a radially inwardly directed force thereon. The spring-biased sealing lip 8a is oriented towards the fluid to be sealed in, that is, it is oriented towards the direction of the bearing 2, whereas the sealing lip 8b which is not spring loaded, serves exclusively as a seal against soiling from the exterior. The housing 5 has a skirt portion 10 which extends generally axially in the direction of the runner ring 6 and conically tapers theretoward. A radially extending annular leg part 11 of the runner ring 6 is, approximately in the plane of the skirt 10 of the housing 5, axially bent towards the skirt 10, whereby an axial runner ring part 12 is formed which is then bent radially towards an axial sleeve portion 13 of the housing 5. The axial sleeve portion 13 is circumferentially engaged by a cylindrical wall of the bearing housing 4. The runner ring 6 is held captive in the housing 5 by radially inwardly bent resilient tabs 14 extending from the axial sleeve part 13 of the housing 5. The tabs 14 may snap behind the runner ring 6 as the housing 5 and the runner ring 6 are axially pressed together during assembly.

In a space or chamber 15 bounded by the skirt and sleeve parts 10 and 13 of the housing 5 and a terminal part of the radial portion 11 of the runner ring 6 there is received a sealing body 16 made of nitrile butadiene rubber introduced into the space 15 in a not fully (incompletely) polymerized condition. During the run-in period, by virtue of the heat generated by moving (rotating) parts, the sealing body 16 is fully polymerized and assumes its permanent configuration by virtue of the temperature effect and also by virtue of the relative rotation between the sealing body 16 and the radial part 11 of the runner ring 6. By virtue of the incompletely polymerized sealing body 16 which, in its new condition, acts as an axial spring, initial frictional losses, among others, are reduced and a labyrinth gap 17 adapted to the sealing environment is obtained between the sealing body 16 and the radial annular part 11 of the runner ring 6, whereby tolerances are compensated for.

Figure 2:
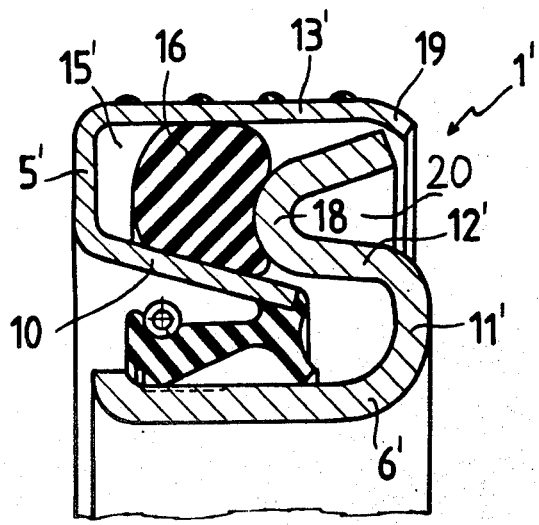
FIG. 2 is an axial sectional view of another preferred embodiment prior to installation in the service environment.

Turning now to FIG. 2, there is shown a shaft seal assembly 1' in the "read-to-install" condition, that is, prior to run-in. The housing 5' and the runner ring 6' are structured differently from the embodiment shown in FIG. 1. The radial portion 11' of the runner ring 6' is similar to the part 11 of the FIG. 1 structure except that the axial portion 12' continues as a bend 18 which is convex as viewed from the chamber 15'. The bend 18 is adjoined by a skirt 20 which widens conically away from the chamber 15' and extends in the direction of the axial sleeve portion 13' of the housing 5'. The sleeve portion 13', in the zone of its free end 19, is bent radially in the direction of the runner ring 6'. These measures ensure that the runner ring 6' is retained in the housing 5' for shipment and installation of the shaft seal assembly 1'. The only partially (incompletely) polymerized sealing body 16 is arranged in the chamber 15' in such a manner that it engages the runner ring 6', under an axial bias, exclusively along the convex part 18. Here too, similarly to the structure shown in an installed state in FIG. 1, a labyrinth gap, following the contour of the convex part 18 is formed as the sealing body 16, in its fully polymerized condition, assumes its permanent shape. Before positioning the sealing body 16 into the space 15 the elastomeric material (nitride butadiene rubber) is partially (incompletely) polymerised in a range of 5 to 50%. When the sealing body 16 is installed it will completely polymerize up to 100% by heat during and by the operational run after positioning the shaft seal assembly 1 into the housing 4.

It will be understood that the above description of the present invention is susceptible to various modifications, changes and adaptations, and the same are intended to be comprehended within the meaning and range of equivalents of the appended claims.

What is claimed is:

1. In a shaft seal assembly for installation and operation in an annular space defined between first and second relatively rotatable machine components; the shaft seal assembly including a housing adapted to engage the first machine component, a runner ring surrounded by the housing and adapted to engage the second machine component, a chamber defined by the housing and bounded by the runner ring and a sealing body disposed in said chamber, the improvement wherein said sealing body is an incompletely polymerized elastomer fully polymerizable subsequent to the installation by heat generated during operation of the first and second machine components.

2. A shaft seal assembly as defined in claim 1, wherein said elastomer is nitrile butadiene rubber.

3. A shaft seal assembly as defined in claim 1, wherein the incompletely polymerized sealing body has a rectangular cross-sectional shape when in an unstressed condition.

4. A shaft seal assembly as defined in claim 1, wherein said sealing body engages said runner ring with a bias in the incompletely polymerized state.

5. A shaft seal assembly as defined in claim 4, wherein said runner ring has an annular convex portion bounding said chamber; said sealing body being in a biased engagement with said runner ring solely at said convex portion.

6. A shaft seal assembly as defined in claim 4, wherein said runner ring has an annular portion of predetermined contour bounding said chamber; further comprising a labyrinth gap defined together by said annular portion of said runner ring and said sealing body in the fully polymerized state thereof; said labyrinth gap having a shape following said contour.

7. A shaft seal assembly as defined in claim 1, wherein said chamber is annular and widens axially in the direction of said runner ring.

8. A method of making a shaft seal assembly for installation and operation in an annular space defined between first and second relatively rotatable machine components; the shaft seal assembly including a housing adapted to engage the first machine component, a runner ring surrounded by the housing and adapted to engage the second machine component, and a chamber defined by the housing and bounded by the runner ring, comprising the following steps:
 (a) positioning an elastomer sealing body in an incompletely polymerized state in said chamber;
 (b) inserting said runner ring in said housing;
 (c) subsequent to steps (a) and (b), installing the shaft seal assembly between the first and second machine components; and
 (d) subsequent to step (c), fully polymerizing said sealing body by effecting operational run of the first and second machine components; said sealing body being fully polymerized by heat generated during and by said operational run.

9. A method as defined in claim 8, wherein step (b) includes the step of causing said runner ring to arrive into and remain in contact with said sealing body in the incompletely polymerized state thereof.

10. A shaft seal assembly for installation and operation in an annular space defined between first and second relatively rotatable machine components; the shaft seal assembly including a housing adapted to engage the first machine component, a runner ring surrounded by the housing and adapted to engage the second machine component, and a chamber defined by the housing and bounded by the runner ring, obtained by the process comprising the following steps:
 (a) positioning an elastomer sealing body in an incompletely polymerized state in said chamber;

(b) inserting said runner ring is said housing;
(c) subsequent to steps (a) and (b), installing the shaft seal assembly between the first and second machine components; and
(d) subsequent to step (c), fully polymerizing said sealing body by effecting operational run of the first and second machine components; said sealing body being fully polymerized by heat generated during and by said operational run.

11. A shaft seal assembly as defined in claim 10, wherein step (b) includes the step of causing said runner ring to arrive into and remain in contact with said sealing body in the incompletely polymerized state thereof.

* * * * *